United States Patent
Domínguez et al.

(10) Patent No.: US 9,920,678 B2
(45) Date of Patent: Mar. 20, 2018

(54) HEAT RECOVERY DEVICE

(71) Applicant: BorgWarner Emissions Systems Spain, S.L.U., Vigo, Pontevedra (ES)

(72) Inventors: Xoan Xosé Hermida Domínguez, Pontevedra (ES); Iago González Tabarés, Ourense (ES)

(73) Assignee: BorgWarner Emissions Systems Spain, S.L.U., Vigo, Pontevedra (ES)

( * ) Notice: Subject to any disclaimer, the term of this patent is extended or adjusted under 35 U.S.C. 154(b) by 0 days.

(21) Appl. No.: 14/771,897

(22) PCT Filed: Feb. 27, 2014

(86) PCT No.: PCT/EP2014/053818
§ 371 (c)(1),
(2) Date: Sep. 1, 2015

(87) PCT Pub. No.: WO2014/131828
PCT Pub. Date: Sep. 4, 2014

(65) Prior Publication Data
US 2016/0010531 A1    Jan. 14, 2016

(30) Foreign Application Priority Data
Mar. 1, 2013 (EP) .................................... 13382066

(51) Int. Cl.
*F01N 5/02* (2006.01)
*F01N 3/04* (2006.01)
*F01N 3/02* (2006.01)

(52) U.S. Cl.
CPC .............. *F01N 5/02* (2013.01); *F01N 3/0205* (2013.01); *F01N 3/043* (2013.01);
(Continued)

(58) Field of Classification Search
CPC .......... F01N 3/0205; F01N 3/043; F01N 5/02; F01N 2240/02; F01N 2240/36; Y02T 10/16
See application file for complete search history.

(56) References Cited

U.S. PATENT DOCUMENTS 6,141,961 A * 11/2000 Rinckel .................. F01N 3/043
60/274
6,942,027 B2   9/2005 Klotten et al.
(Continued)

FOREIGN PATENT DOCUMENTS

EP     1493951 A2 *  1/2005  ............. F01N 1/166
GB     249015 A     2/2013

OTHER PUBLICATIONS

Machine Translation of EP1493951 A2.*

Primary Examiner — Brandon Lee
(74) Attorney, Agent, or Firm — BrooksGroup

(57) ABSTRACT

The present invention relates to a heat recovery device particularly suitable for internal combustion engines, and more particularly suitable for engines incorporating a WHRS (waste heat recovery system). The device of the invention relates to the occasional recovery of heat from the exhaust gases where the invention carries out this function such that the main conduit where the exhaust gases circulate is not affected by a noticeable increase in heat loss due to the incorporation of said device. It provides a heat exchanger (3.6) and a bypass flap valve (3.8) upstream for selectively diverting the exhaust gases to the main exhaust conduit (1) or to the heat exchanger (3.6).

12 Claims, 8 Drawing Sheets

(52) U.S. Cl.
CPC ...... *F01N 2240/02* (2013.01); *F01N 2240/36* (2013.01); *Y02T 10/16* (2013.01); *Y02T 10/20* (2013.01)

(56) References Cited

U.S. PATENT DOCUMENTS

| | | |
|---|---|---|
| 7,264,040 B2 | 9/2007 | Bush et al. |
| 2009/0014674 A1* | 1/2009 | Grissom ............... F01D 17/145 251/298 |
| 2012/0017575 A1 | 1/2012 | Sloss |
| 2013/0047591 A1 | 2/2013 | Moehlmann et al. |

* cited by examiner

HEAT RECOVERY DEVICE

OBJECT OF THE INVENTION

The present invention is a heat recovery device particularly suitable for internal combustion engines, and more particularly suitable for engines incorporating a WHRS (waste heat recovery system). The device of the invention relates to the occasional recovery of heat from exhaust gases where the invention carries out this function such that the main conduit where the exhaust gases circulate is not affected by a noticeable increase in head loss due to the incorporation of said device.

BACKGROUND OF THE INVENTION

The basic principles of heat recovery in internal combustion engines are simple. Exhaust gases are high-temperature gases that are given off into the atmosphere wasting a large amount of energy. If these gases are passed through a heat exchanger, part of the heat is transferred to another fluid for being used in various applications and its energy is partially exploited. These applications include, mentioned by way of example, heating the vehicle interior or increasing the engine oil temperature at the moment of starting so that it reaches optimal lubrication conditions in the shortest time possible.

The passage of exhaust gases through the heat exchanger does not have to occur at all times, so the existence of a bypass valve that manages the passage of hot gas either through the heat exchanger or through the main conduit arranged in parallel with the heat exchanger and therefore without the interposition of the exchanger is necessary.

Bypass valves have a primary chamber which is in fluidic communication with one inlet and two outlets such that the position of an internal flap establishes if the fluid is diverted from the inlet to one outlet or to the other. The diversion of the flow in one direction or the other always entails a pressure loss.

When heat exchanger is used only on occasions because heat recovery is a function that is used only now and again, the pressure loss in the bypass valve penalizes the overall performance of the engine continuously even in the event that the heat recovery function is not used.

The present invention solves this technical problem as it is provided with a heat recovery device that almost introduces no loss and produces almost no modifications in the flow when the bypass valve is positioned such that the gas goes through the main conduit by closing and preventing passage through the heat exchanger. This technical problem is solved with a special configuration of the valve such that the main conduit has an internal configuration that is almost identical to the configuration that it would have without incorporating the heat recovery device, i.e., the flow path is virtually left unaffected by the incorporation of the heat recovery device.

DESCRIPTION OF THE INVENTION

The present invention is a heat device particularly suitable for being installed in an exhaust conduit of an internal combustion engine, and more particularly suitable for an engine incorporating a heat recovery system for recovering heat from exhaust gases.

As previously indicated, this device allows occasional heat recovery so most of the time the hot gas flow circulates through the main exhaust conduit without being diverted to the heat exchanger. The configuration features of the heat recovery device are such that this flow through the main conduit is virtually unaffected by the existence of a bypass valve and the heat exchanger. As a result of the flow not being affected, there is a head or pressure loss close to the loss which is obtained if neither the heat recuperator nor the bypass valve was present.

The heat recovery device allows being installed on an exhaust gas passage conduit in a motorized vehicle extending along a longitudinal direction X-X', according to a section S, and having two openings in its wall. These openings allow installing the device on this conduit. An opening is located upstream for diverting all or part of the flow through the heat exchanger and the second opening is located downstream for returning the gas flow to the main conduit after having extracted part of its heat for recovery.

The device comprises:
  a heat exchanger in turn comprising:
    a core formed by one or more exchange conduits located inside a shell intended for housing a coolant fluid, preferably a coolant liquid, where said shell has at least one inlet and one outlet for the passage of the coolant fluid to remove the heat transferred from the gas to said coolant fluid.
  The core of exchange conduits transports gas from the inlet into the exchanger to the outlet of the exchanger. In the preferred example used in the detailed description of the invention, these conduits extend between two baffles used to keep the ends of the conduits forming the core secured and spaced from one another and at the same time close the ends of the chamber formed by the shell where the coolant liquid covering the core of conduits is located. The coolant fluid is the fluid that transports the heat yielded by the hot gas and is therefore the carrier that transports the recovered heat.
  A first coupling body having a seating suitable for being coupled to an opening of the exhaust conduit providing fluidic communication between the inside of the exhaust conduit through said opening with the inside of the exchange conduit or conduits of the core of the heat exchanger,
  a second coupling body having a seating suitable for being coupled to an opening of the exhaust conduit different from the opening to which the first coupling body is coupled, providing fluidic communication between the inside of the exchange conduit or conduits of the core of the heat exchanger through said opening with the inside of the exhaust conduit,
  the first coupling body and the second coupling body are in fluidic communication with the inside of the exchange conduit or conduits of the core at opposite ends of said exchange conduit or conduits.
  The first coupling body and the second coupling body are intermediate elements where the first element defines a fluidic communication between a first opening of the exhaust conduit and the ends of the conduits of the core of the heat exchanger, and the second element defines a fluidic communication between the opposite ends of the conduits of the core of the heat exchanger with the second opening. These communications establish a hot gas flow path going from the first opening to the second opening, passing through the conduits of the core of the exchanger. This path is available or unavailable depending on how the bypass valve is managed.

A bypass valve in turn having two end positions, a first end position for closing the exhaust conduit to divert the passage of gas coming from the exhaust conduit through the heat exchanger; and a second end position for opening the exhaust conduit preventing the passage of gas coming from the exhaust conduit through the heat exchanger;

The path of the gas exiting through the first opening and returning through the second opening after going through the core of conduits of the heat exchanger is available or unavailable depending on how this bypass valve is managed. In the end positions the flow either continues its course without its path being affected, or is alternatively diverted through the heat exchanger for heat recovery.

It is further verified that:

the bypass valve is arranged in the first body and comprises a flap pivoting with respect to a geometric axis Y-Y', the axis of rotation Y-Y' of the flap is arranged essentially perpendicular to the longitudinal direction X-X' of the exhaust conduit; and said geometric axis of rotation Y-Y' is spaced from the same longitudinal axis X-X' such that it is located outside the section S of the exhaust conduit, The flap of the bypass valve is the element responsible for diverting the flow that usually circulates through the exhaust conduit so that it circulates through the exchanger. This flap has a surface responsible for closing the passage of the exhaust conduit and said surface pivots about the axis of rotation Y-Y'. The condition that the axis of rotation Y-Y' is outside the section S of the exhaust conduit means that the invariant zone, i.e., the zone of the shaft, of the flap, the moving element, is not arranged invading the section S of the exhaust conduit during the motion. This condition means that when observing the exhaust conduit according to a direction coinciding with axis X-X', it does not have a modified or smaller section due to the presence of the bypass valve in its position for opening the exhaust conduit. In other words, the section S is the section taken according to a plane perpendicular to the longitudinal direction X-X' and coincides with the projection of the inside of the conduit according to this same plane. The condition on the orientation and position of the axis Y-Y' means that the projection according to direction X-X' is not affected by the existence of the flap when said flap is closing the passage to the heat exchanger. If there is any variation of the section, it is minimal and can be, for example, due to the existence of a specific thickness of the flap when it closes on the seating which allows closing the flow to the heat exchanger, as just one example.

With respect to the condition of perpendicularity of the axis of rotation Y-Y' with respect to the longitudinal axis X-X', it allows a rotation that is suitable so that the flap is capable of invading the inside of the exhaust conduit and thereby establishing the closure of said exhaust conduit to divert the flow to the heat exchanger.

the first coupling body has a seating for the flap where the flap rests closing the passage from the exhaust conduit to the heat exchanger when the bypass valve is in the second end position; and where this seating for the flap is configured such that said flap in this second end position is located outside the section S of the exhaust conduit.

If the preceding condition places the region of the flap that does not move in response to rotation, i.e., the zone close to the shaft, outside the section S, "outside" being understood as its projection according to the longitudinal direction X-X' not having a common intersection with the projection of the area S, in this condition the rest of the flap would also be placed outside the section S in the position in which the passage of the exhaust conduit is not closed. In other words, the flap does not interfere in the flow circulating through the exhaust conduit when said flap is in a position for closing said exhaust conduit.

the flap is configured to block the exhaust conduit preventing the passage of gas therethrough and diverting it to the heat exchanger through the opening on which the first coupling body is coupled when the valve is in its first end position; and where in the blocking position the flap establishes support with the inner surface of the exhaust conduit.

The flap has two end positions. This condition determines the manner in which the flap itself achieves closing on the exhaust conduit. By means of rotation through its axis of rotation Y-Y' said valve is positioned entering through the first opening until being placed inside, closing the section S of the exhaust conduit. The flap furthermore establishes support with the inner surface of the exhaust conduit preventing the flow through the exhaust conduit on one hand and a stable position on the other in which the inner walls of the conduit act as a closure seating.

The embodiment used in a detailed description will describe how the flap is obliquely positioned in the inner walls of the exhaust conduit so that the differential pressure established on either side of the flap generate a wedge force that keeps this position stable.

Other particular embodiments which will be described below also take into account solutions intended to prevent the flap from becoming blocked or locked in place due to manufacturing defects or due to the effect of expansions.

DESCRIPTION OF THE DRAWINGS

The foregoing and other features and advantages of the invention will be more clearly understood from the following detailed description of a preferred embodiment given solely by way of illustrative and non-limiting example in reference to the attached drawings.

DETAILED DESCRIPTION OF THE INVENTION

The set of FIGS. 1 to 7 shows an embodiment of the invention which, in addition to incorporating the essential features thereof, incorporates specific particular solutions that solve problems that will be identified in this description.

Figure 1:
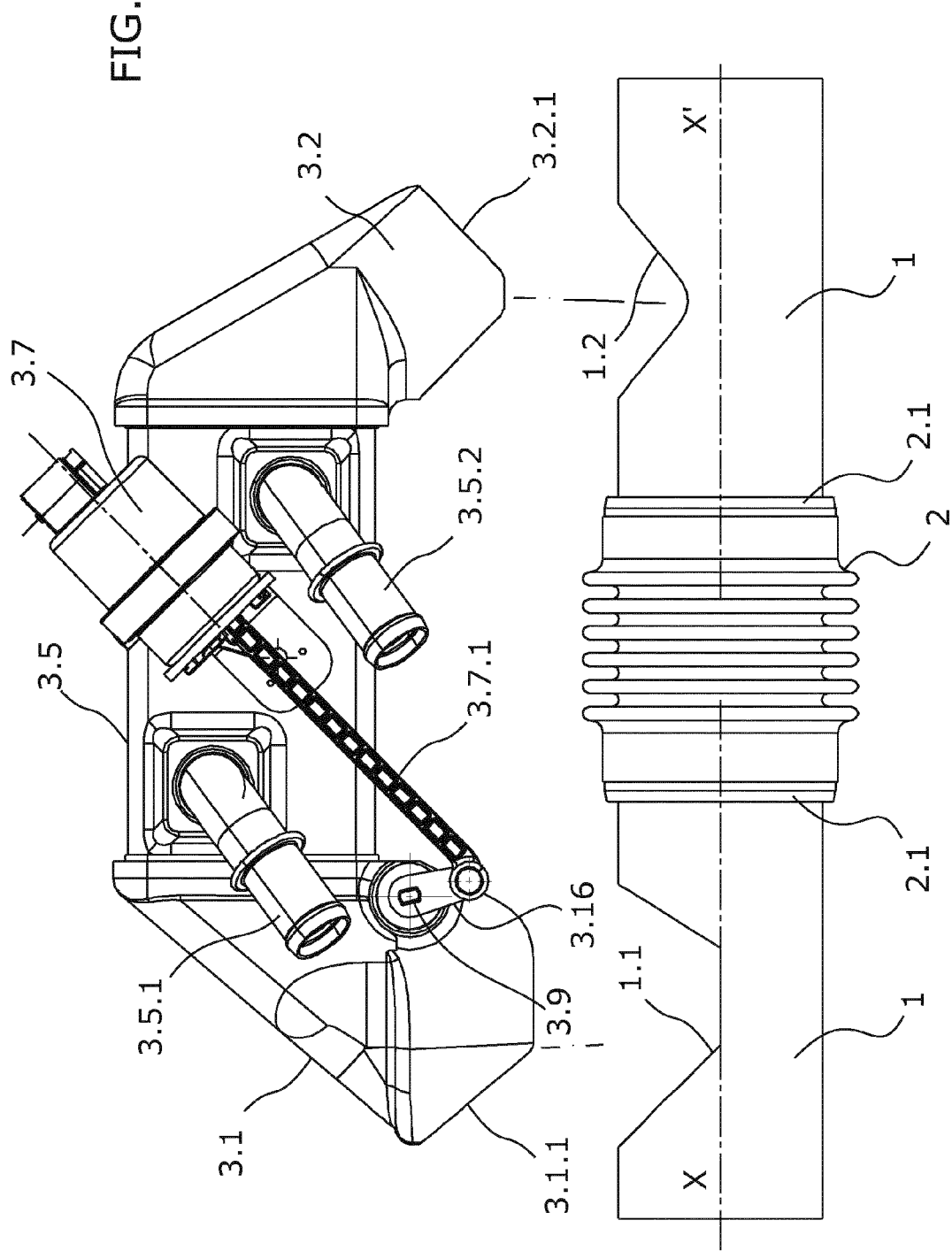
FIG. 1 shows an elevational view of the embodiment that will also be shown in the remaining drawings. This view shows the exhaust conduit with the first and the second openings suitable for receiving the device of the invention, where this device comprises the heat exchanger for the heat recovery and a bypass valve together with the actuator managing the position of said bypass valve.

FIG. 1 shows an elevational view where an exhaust conduit (1) through which the hot exhaust gas from which a part of the energy is to be extracted, recovering it for other uses, operatively circulates is located in the lower part. Two openings, a first upstream opening (1.1) and a second downstream opening (1.2), have been made in the exhaust conduit (1). The orientation chosen in the graphic depiction of FIG. 1 is such that the left side corresponds to the upstream position and the right side to the downstream position. The exhaust gas would therefore circulate in the exhaust conduit (1) shown from left to right.

Opening (1.1) and the other opening (1.2) are oriented towards the same side which, according to the orientation shown in FIG. 1, is shown facing up. The first opening (1.1) has a section demarcated by two oblique planes converging until reaching the midplane which, according to FIG. 1, coincides with the longitudinal direction X-X'. This configuration allows a good entrance for the heat recovery device and at the same time prevents leaks in the flow due to a poor bypass valve closure.

On the other hand, the second opening (1.2) has a V-shaped configuration where in this case said opening has not been extended to the midplane coinciding in this view with the longitudinal direction X-X'.

The device according to this embodiment is shown located on the openings (1.1, 1.2). The installation of the heat recovery device on the exhaust conduit (1) requires lowering until coinciding the device with the windows (1.1., 1.2), lowering being interpreted as the downward movement according to the chosen orientation for FIG. 1.

The heat recovery device comprises a heat exchanger (3) in turn formed by a shell (3.5) housing the coolant fluid responsible for removing the heat that is recovered and extracted from the exhaust gas. The shell (3.5) has an inlet (3.5.1) and an outlet (3.5.2) for establishing the coolant fluid flow. A core (3.6) of conduits for the passage of exhaust gas when the gas is diverted to go through the heat exchanger (3) is located inside the shell (3.5) and covered by the coolant fluid. The internal configuration of the conduits forming the core (3.6) of the heat exchanger is shown in FIGS. 2A and 2B.

Figure 2A:
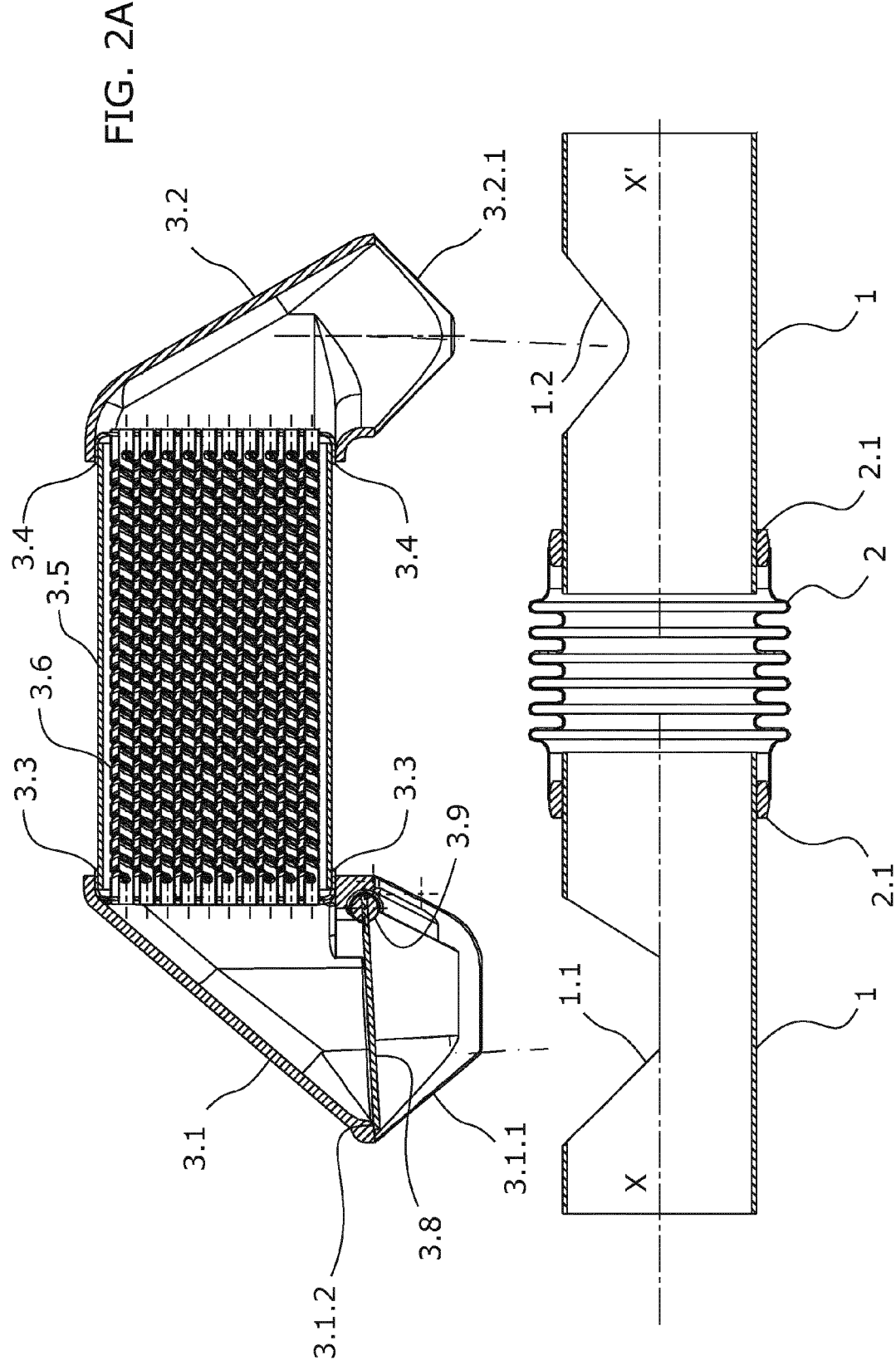
FIGS. 2A and 2B show a section of the view shown in FIG. 1 where FIG. 2A includes a spaced position of the exhaust conduit on which the device is installed, and where FIG. 2B includes the final position after being installed on the exhaust conduit. In this second drawing the position of the bypass valve is the position for closing the passage of gas through the exhaust conduit to divert it through the heat exchanger.
Figure 2B:
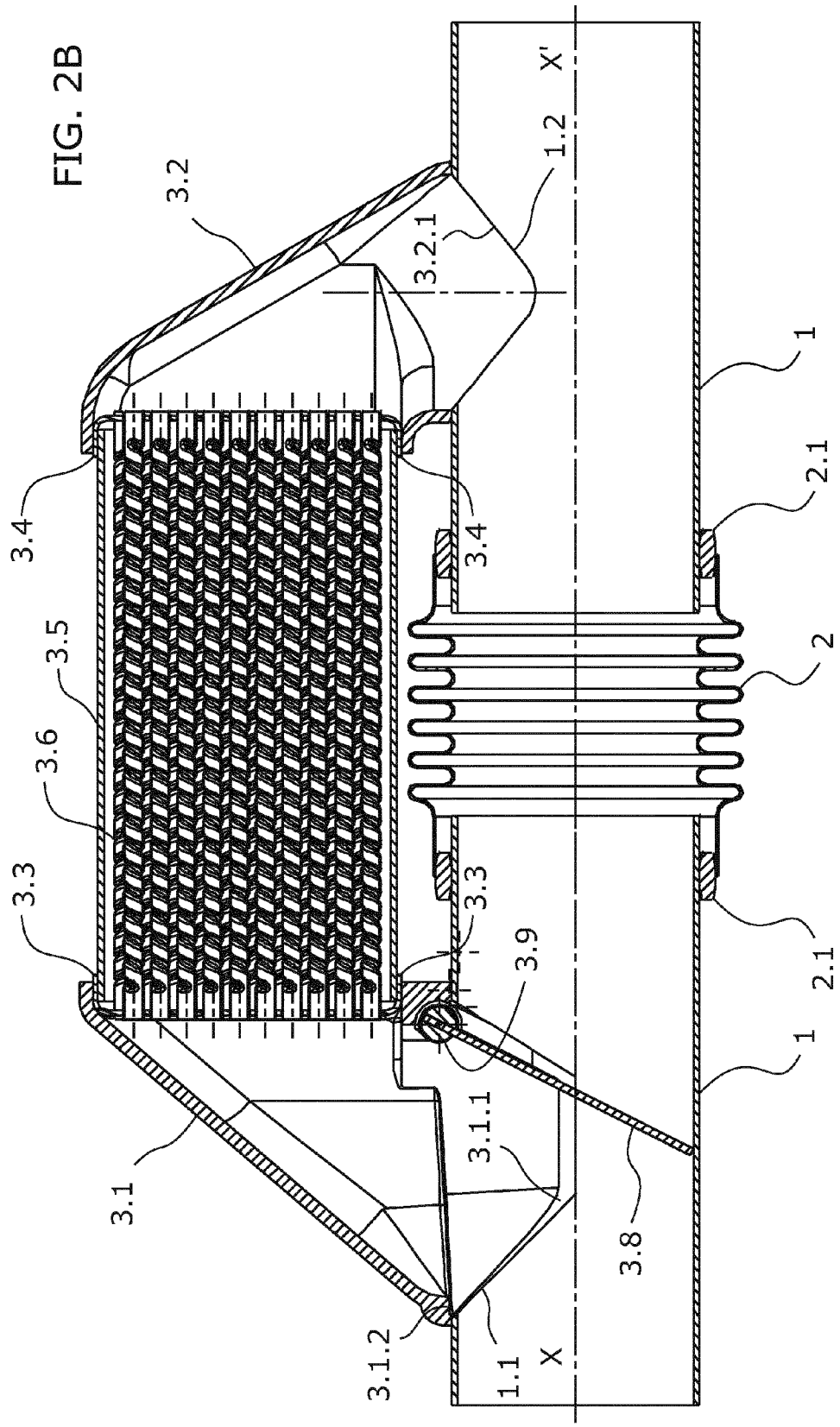

In these same FIGS. 2A and 2B, it can be seen how the conduits of the core (3.6) extend between two baffles (3.3, 3.4) which enclose the coolant liquid between the ends of the shell (3.5) and at the same time allow the gas reaching the baffles (3.3, 3.4) to be in communication with the inside of the conduits of the core (3.6).

The baffles (3.3, 3.4) in this embodiment externally encircle the shell (3.5), closing the inner chamber housing the coolant fluid.

Once the heat recovery device is installed in the exhaust conduit (1), each of the openings (1.1, 1.2) of the exhaust conduit (1) is in fluidic communication with the inside of the conduits of the core (3.6) of the exchanger by the interposition of a first coupling body (3.1) and a second coupling body (3.2).

The first coupling body (3.1) has a seating (3.1.1) suitable for being adjusted to the configuration of the first opening, closing said opening (1.1) along the perimeter. Likewise, the second coupling body (3.2) has a seating (3.2.1) suitable for being adjusted to the configuration of the second opening, closing said second opening (1.2) along the perimeter.

The first coupling body (3.1) comprises a bypass valve for managing the passage of exhaust gas either through the exhaust conduit (1) as if there were no heat recuperator or through the heat exchanger (3) to recover heat that is removed through the coolant fluid.

FIG. 1 depicts a linear actuator (3.7) which by means of a rod (3.7.1) operates a lever (3.16) integral with the shaft (3.9) of the bypass valve responsible for managing the passage of exhaust gas either through the exhaust conduit (1) or through the heat exchanger (3).

As is shown in this same FIG. 1, the heat exchanger (3) is located parallel to the exhaust conduit (1). The passage of hot gas through the heat exchanger (3) or alternatively through the exhaust conduit (1) means that either the exchanger (3) or the exhaust conduit (1) is hot. The difference in temperature between the components associated with both gas paths gives rise to expansions that are also different and therefore to stresses that could damage the device. A compressible conduit sector (2) in the form of a bellows capable of absorbing expansion differences without generating stresses that give way to breaking or cracking has been incorporated in this embodiment to solve this expansion problem. This compressible conduit sector (2) divides the exhaust conduit (1) into an upstream sector and a downstream sector, and the attachment between the exhaust conduit (1) and the compressible conduit (2) has been carried out by means of two coupling rings (2.1).

The sections shown in FIGS. 2A and 2B allow observing the position of the bypass valve formed by a shaft (3.9) in turn housing a flap (3.8) in a groove (3.9.1) through a lug (3.8.1). The detail of the groove (3.9.1) is shown in the exploded perspective view of FIG. 3. FIG. 2A shows the flap (3.8) closing the passage of gas to the exchanger (3). The closure is carried out on a seating (3.1.2) arranged in the first coupling body (3.1). The step formed by the end of the flap (3.8) when it is located on the seating (3.1.2) and shown in FIG. 2A coincides with the thickness of the exhaust conduit (1) so said step does not exist when the heat recovery device is installed on the exhaust conduit (1). In other words, according to the section shown in FIGS. 2A and 2B the flap prolongs according to the exhaust conduit (1) and therefore there is flow continuity.

The position of the shaft (3.9) of the flap (3.8) is also located right above where the section of the exhaust conduit (1) ends such that it does not invade the section S of said exhaust conduit (1). So when the flap (3.8) is located such that it closes the passage to the heat exchanger (3), neither the flap (3.8) nor its shaft (3.9) invade the section S of the conduit (1), and therefore almost no head loss is generated due to their presence. In this particular case the flap (3.8) is formed by a die-cut plate given its low manufacturing cost. When the flat plate is closing the passage to the heat exchanger (3), it defines small cavities given that since it is flat it does not fit the cylindrical surface that would correspond to the surface of the exhaust conduit (1) that has been removed to open the first opening (1.1) and so that the flap (3.8) has access to the inside of the exhaust conduit (1) to achieve the closure thereof. It has been proven that these cavities defining a slight expansion in the exhaust conduit (1) do not noticeably affect head loss. Nevertheless, it is possible to configure a flap (3.8) that has bulging portions on either side filling in this volume so that the internal configuration of the exhaust conduit (1) covered by the flap (3.8) is also cylindrical, thereby even further reducing pressure losses due to the passage of the exhaust gas flow.

The section of FIG. 2B shows the flap (3.8) closing the exhaust conduit (1). In this position the flap (3.8) is arranged obliquely to facilitate the entrance of gas into the heat exchanger (3) and also to have a wedged support of the flap (3.8) on the inner surface of the exhaust conduit (1) stably favoring this position due to the pressure of the gas without the shaft (3.9) having to exert any force at all.

The same figure shows a sector of the flap (3.8) located above the line representing the longitudinal direction X-X' and another sector located below it. The sector located above it coincides with the opening (1.1) such that this sector of the flap (3.8) has been configured with straight sides (3.8.4). In contrast, the second sector must be adapted to the circular section of the exhaust conduit (1) so the perimeter (3.8.2) of the flap (3.8) located in this sector below the line according to the longitudinal direction X-X' is elliptical so that it fits the inner shape of the conduit.

If instead of having a circular exhaust conduit (1) the section was different, the section of the flap (3.8) would have to be adapted to the inside of said conduit according to the section of an oblique plane coinciding with the end position of the flap (3.8) when it closes the exhaust conduit (1). Both the seating (3.1.2) of the flap (3.8) and the shape of the flap (3.8) are shown in detail in the exploded perspective view of FIG. 3. This view also shows the existence of end ribs (3.8.3) favoring a point support of the flap (3.8) on the inner surface of the exhaust conduit (1). This point support prevents the flap (3.8) from becoming locked in place due to the effect of expansions or minor manufacturing defects inside the exhaust conduit (1).

Figure 3:
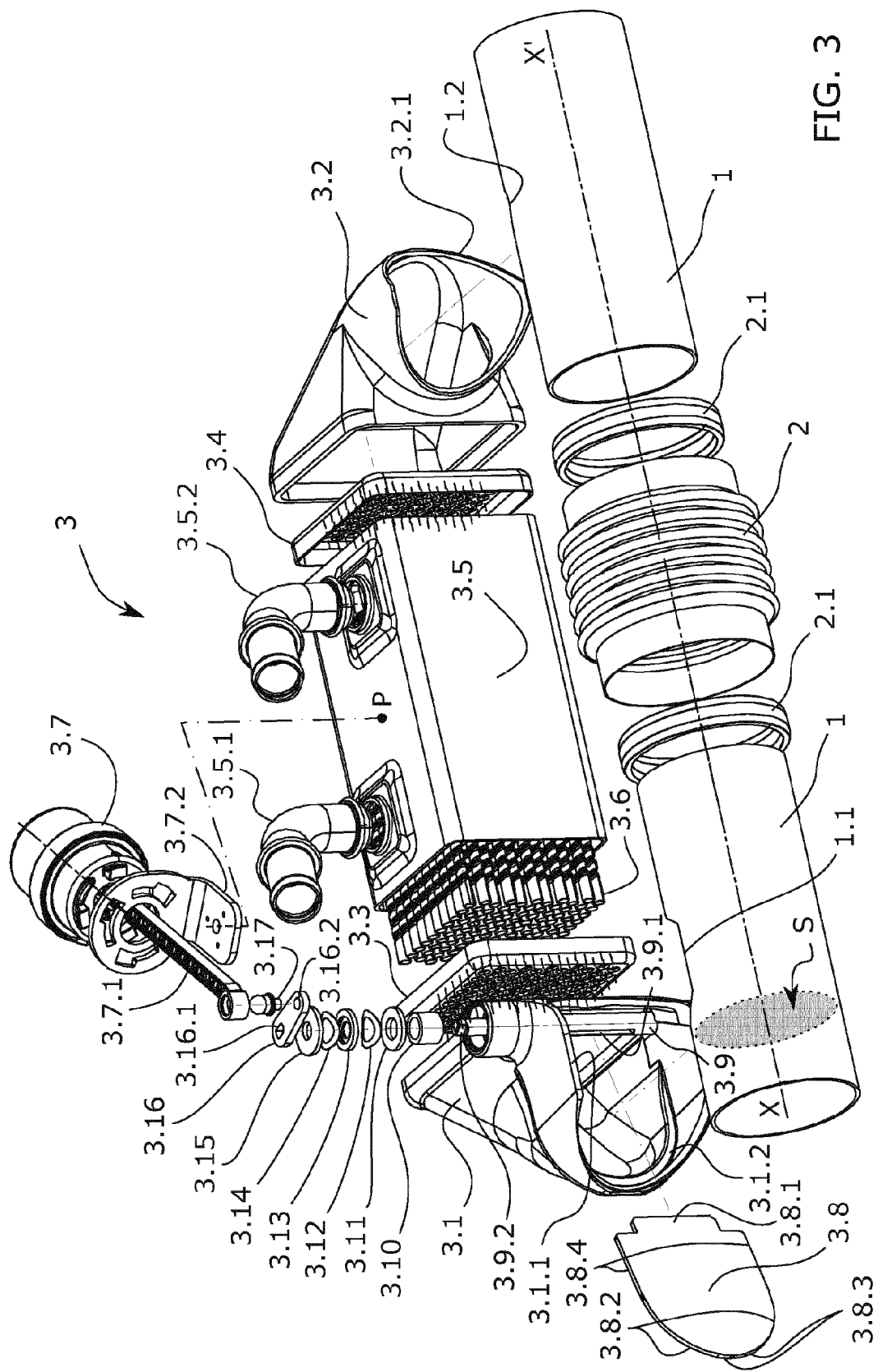
FIG. 3 shows an exploded perspective view of the device separate from the exhaust conduit. This exploded perspective view allows seeing the components of the heat exchanger and of the shaft of the flap.

In addition to showing the already described elements in detail in the exploded perspective view, the section S, which is a circular area in this case, has been identified in said FIG. 3.

Figure 4:
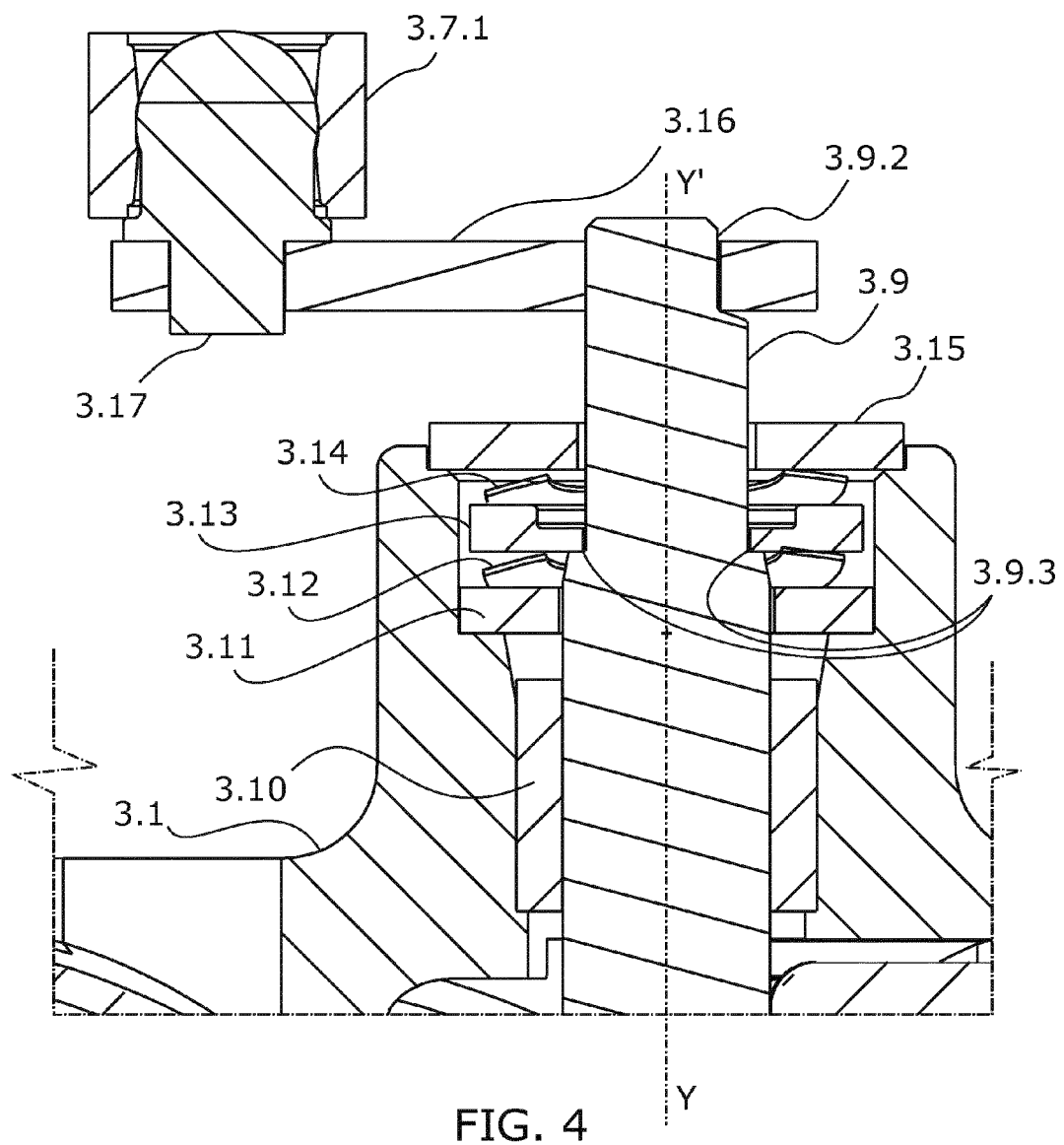
FIG. 4 is a section of the shaft of the flap in the area where there is a cluster of elastic washers which allow the correct positioning of the flap when it is closing the exhaust conduit to prevent becoming locked in place.

This figure combined with FIG. 4 holds particular interest in the description of the detail of the shaft (3.9) of the flap (3.8) together with all the components shown in the exploded perspective view in FIG. 3 and already assembled in FIG. 4, and they allow for specific axial play in said shaft (3.9).

The closure of the flap (3.8) on the inner surface of the exhaust conduit (1) requires the axis of symmetry of the flap (3.8) to be suitably centered with respect to the longitudinal axis X-X' of the exhaust conduit (1) because it would otherwise rub against one of the side walls or would leave excessive clearance also in one of the side walls. An uneven expansion can lead to some of these problems. To solve this problem, the embodiment incorporates a floating shaft (3.9) about an intermediate position and being elastically biased to recover this intermediate position. The closure of the flap (3.8) can therefore contact one of the inner walls of the conduit (1), but this contact moves the flap (3.8) to the center as a result of being elastically biased to be located about a specific point. The elastic forces are overcome, and the flap (3.8) adopts the position which allows the closure.

To achieve this axial clearance along the axis of rotation Y-Y' of the shaft (3.9), said shaft has a graphite bushing (3.10) guiding its axial motion with little friction. One of the ends of the shaft has a bevel (3.9.2) housed in a seating (3.16.1) of the lever (3.16) which is operated by means of the linear actuator (3.7). The actuation is carried out through the pushrod (3.7.1) linked through a pivot (3.17) housed in a borehole (3.16.2) of the end of the lever (3.16). With this configuration, the linear movement of the linear actuator (3.7) translates into a rotation of the shaft (3.9). The actuator (3.7) has minor capacity to rotate in its support (3.7.2) about point P to absorb minor changes in orientation of the pushrod (3.7.1) due to the rotation of the lever (3.16).

It has been mentioned that in addition to rotation, the shaft (3.9) is provided with axial movement along axis Y-Y'. The shaft has a step (3.9.3) due to a reduction in its diameter close to the end of the shaft (3.9) where the bevel (3.9.2) meets the lever (3.16).

The step (3.9.3) serves as a seating for an intermediate fixing ring (3.13). This intermediate fixing ring (3.13) fits tightly against the shaft (3.9) such that the shaft (3.9) and the intermediate fixing ring (3.13) are integral with one another. The intermediate fixing ring (3.13) has respective flexible washers (3.12, 3.14), "Belleville" type washers for example, both above and below it.

The lower flexible washer (3.12) is placed in a support washer (3.11) which is in turn fixed with respect to the first coupling body (3.1), being fixed in a step thereof.

The upper flexible washer (3.14) is limited in the top portion by means of a sealing ring (3.15) which is also fixed with respect to the first coupling body (3.1), being fixed in another step thereof.

With this configuration, the flexible rings (3.12, 3.14) are compressed because they are located between the sealing ring (3.15) and the support washer (3.11) which keep them compressed.

The axial movement of the shaft (3.9) leads to increased compression of one of the flexible washers (3.12, 3.14) and decompression of the other flexible washer (3.12, 3.14). When the force causing this movement disappears, the flexible rings (3.12, 3.14) tend to balance out the compressive stresses by again taking the shaft (3.9) to its balanced position. This elastic behavior about a point of balance is transferred to the flap (3.8) such that the flap (3.8) also has a point of balance about which it can move, i.e., always being elastically biased to return to its point of balance. Even though the flap (3.8) has the function of diverting the flow by closing the passage through the heat exchanger (3) or the passage through the exhaust conduit (1) at its end positions, it is possible for this closure to not be entirely leak-tight due to allowances or due to the presence of its end ribs (3.8.3) to prevent becoming locked in place due, for example, to expansion.

Figure 5:
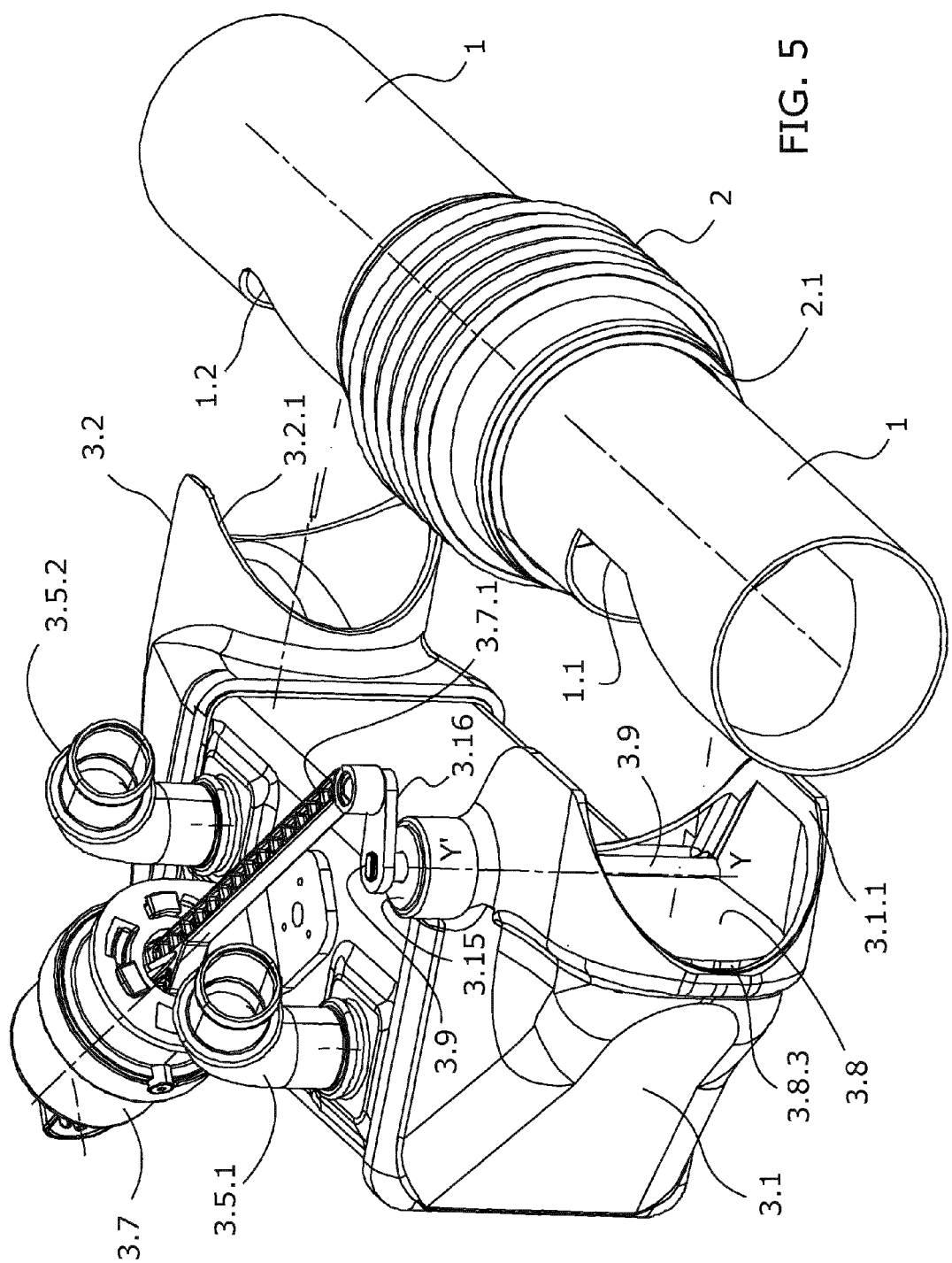
FIG. 5 shows a perspective view of the device assembled and spaced from the exhaust conduit to show several details of the parts which allow coupling with the openings of the exhaust conduit.

FIG. 5 shows the device assembled and separated from the exhaust conduit (1) in a perspective view which allows showing the shape of the seatings (3.1.1, 3.2.1) which is suitable for being coupled to the openings (1.1, 1.2) in the exhaust conduit (1) and the position of the shaft (3.9) and of the flap (3.8) such that they do not interfere in the exhaust gas flow at the end position thereof closing the passage to the heat exchanger (3).

Figure 6:
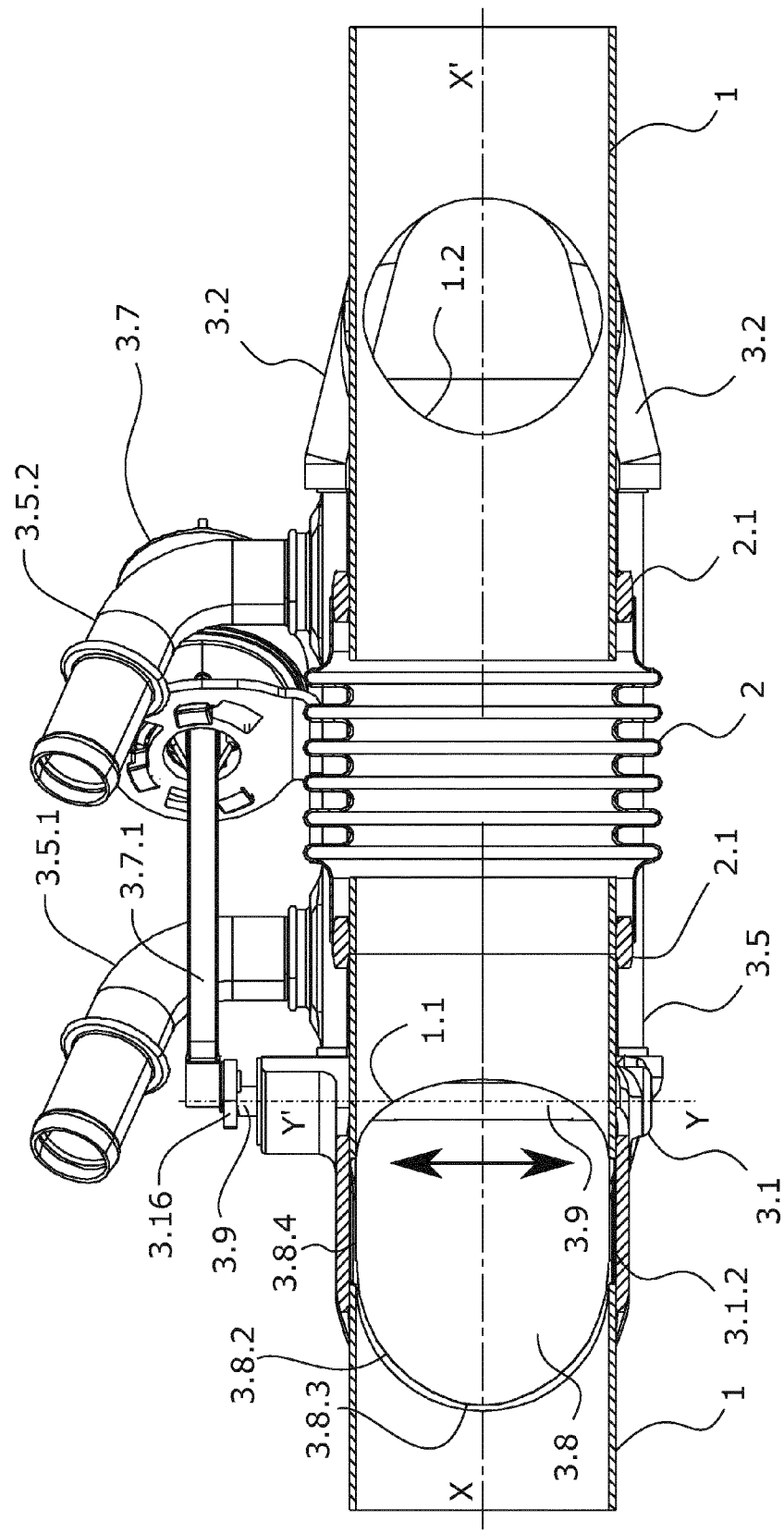
FIG. 6 shows a section of the exhaust conduit according to the longitudinal direction X-X' with an orientation that allows observing behind the section the heat recovery device coupled to the exhaust conduit.

FIG. 6 shows a section of the exhaust conduit (1) according to a plane leaving the heat recovery device behind it. This section reveals the flap (3.8) with its straight sides (3.8.4) fitting the non-sectioned part and its elliptically configured support sector (3.8.2) ending in ribs (3.8.3) to adapt to the circular section configuration of the exhaust conduit (1) in an oblique closing position.

A double black arrow is used to indicate the possible direction of movement of the assembly formed by the shaft (3.9) and the flap (3.8) allowed by clearance and with an elastic behavior due to the technical solution based on the combination containing the already described group of flexible rings (3.12, 3.14).

An assembly error or a sizing error of some parts can lead to inadequate positioning of the flap (3.8) with respect to the exhaust conduit (1). In this particular case, minor misalignments lead to deficient closure or even becoming locked in place. The flexible behavior with respect to the axial movement of the shaft (3.9) means that the device tends to be automatically located in the optimal position as a result of the elastic behavior without requiring external adjustment.

Although the use of flexible rings (3.12, 3.14) has been described, the alternative use of other elastic means is also possible.

Figure 7:
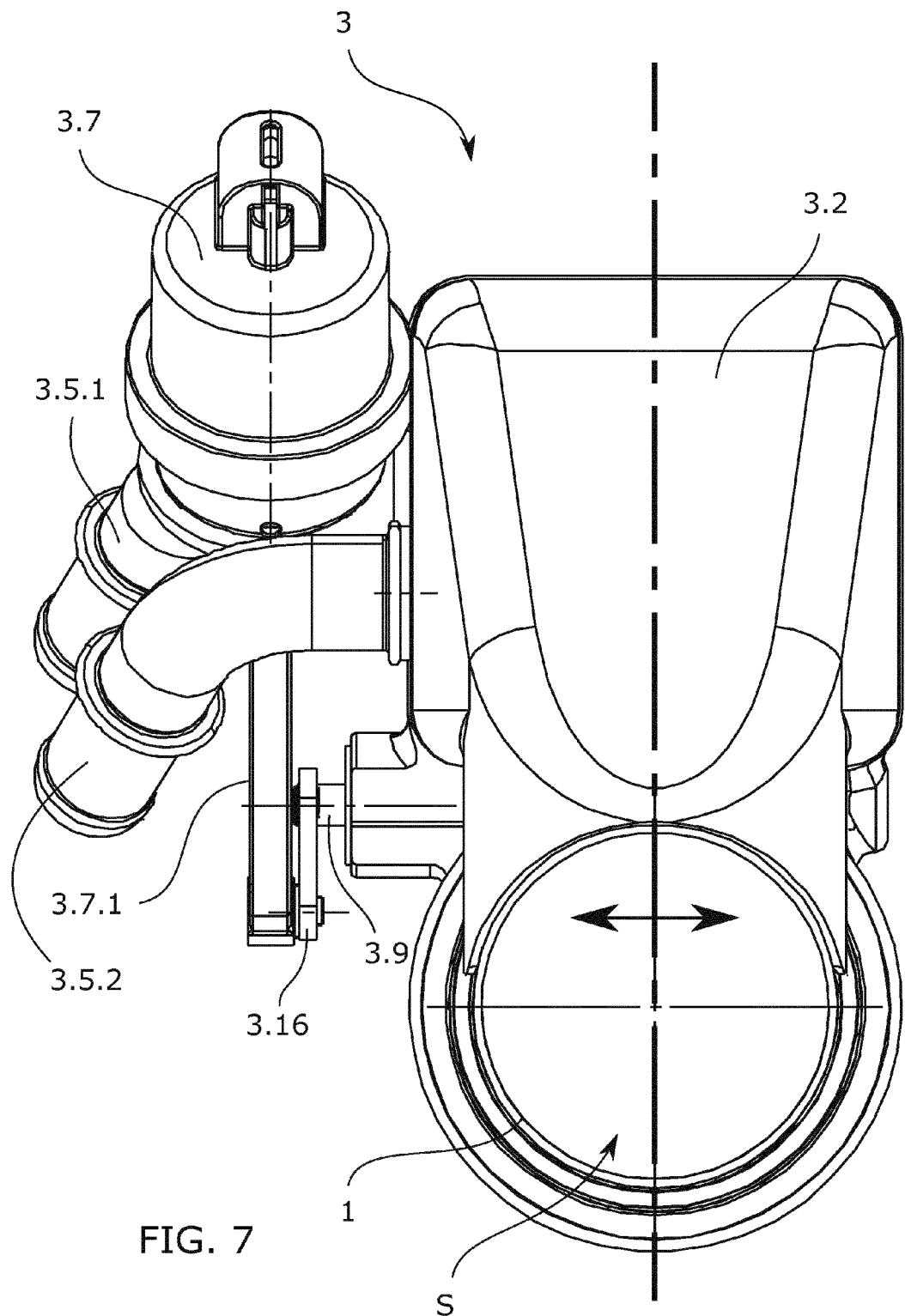
FIG. 7 shows the heat recovery device coupled to the exhaust conduit according to the profile such that it is possible to observe the projection of the inside of the exhaust conduit according to the longitudinal direction X-X' identifying the section S according to its actual dimension.

The orientation chosen in the view shown in FIG. 7 allows not only observing the possible direction of movement of the flap (3.8) by means of minor play biased to remain in a balanced position, also indicated using a double arrow, but it allows observing how incorporating a bypass valve maintains a circular section S without any restriction whatsoever to the passage of gas when the flap (3.8) is located at the end position of preventing passage to the heat exchanger (3). Given that this position is the usual position, the presence of a heat recuperator in the exhaust conduit (1) is for the most part not penalized with a pressure drop.

The invention claimed is:

1. A heat recuperator comprising:
a heat recovery device, and
an exhaust gas passage conduit extending along a longitudinal direction X-X', according to a section of the exhaust gas passage conduit, and having a first and a second opening in a wall of the exhaust gas passage conduit,
where the heat recovery device comprises:
a heat exchanger comprising:
a core formed by one or more exchange conduits located inside a shell intended for housing a coolant fluid, where said shell has at least one inlet and one outlet for a passage of the coolant fluid to remove the heat transferred from an exhaust gas to said coolant fluid,
a first coupling body having a seating coupled to the first opening of the exhaust conduit providing fluidic communication between an inside of the exhaust conduit through said first opening with an inside of the exchange conduit or conduits of the core of the heat exchanger,
a second coupling body having a seating coupled to the second opening of the exhaust conduit, the second opening being different from the first opening to which the first coupling body is coupled, providing fluidic communication between the inside of the exchange conduit or conduits of the core of the heat exchanger through said second opening with the inside of the exhaust conduit,
the first coupling body and the second coupling body are in fluidic communication with the inside of the exchange conduit or conduits of the core at opposite ends of said exchange conduit or conduits,
a bypass valve having two end positions, a first end position for closing the exhaust conduit to divert the exhaust gas coming from the exhaust conduit through the heat exchanger; and a second end position for opening the exhaust conduit to prevent the exhaust gas coming from the exhaust conduit through the heat exchanger;
wherein:
the bypass valve is arranged in the first coupling body and comprises a flap pivoting with respect to a geometric axis of rotation Y-Y',
the geometric axis of rotation Y-Y' is arranged perpendicular to the longitudinal direction X-X' of the exhaust conduit; and said geometric axis of rotation Y-Y' is spaced from the longitudinal axis X-X' such that said geometric axis of rotation Y-Y' is located outside the section of the exhaust conduit,
the first coupling body has a seating for the flap where the flap rests while closing the heat exchanger when in the second end position; and where the seating for the flap is configured such that said flap is located outside the section of the exhaust conduit when in the second end position,
the flap is configured to block the exhaust conduit to prevent the exhaust gas therethrough and diverting the exhaust gas to the heat exchanger through the first opening on which the first coupling body is coupled in the first end position;
wherein said first opening reaches to a midplane contained in the longitudinal axis X-X' of the exhaust conduit without exceeding the midplane and said second opening has a v-shaped configuration;
and the flap establishes support with an inner surface of the exhaust conduit when in the first end position.

2. The heat recuperator according to claim 1, wherein the flap has a clearance with movement according to a direction defined by the geometric axis of rotation Y-Y' to allow the seating of said flap to the inside of the exhaust conduit.

3. The heat recuperator according to claim 2, wherein the flap is integral with a shaft pivoting about the geometric axis of rotation Y-Y' and the shaft is provided with the clearance.

4. The heat recuperator according to claim 3, wherein:
the shaft has an intermediate fixing ring,
the seating of the first coupling body comprises a first and a second seatings and facing each other,
the direction of the geometric axis of rotation Y-Y', the intermediate fixing ring is located between the first and the second seatings; and
a first elastic washer located between the first seating and the intermediate fixing ring,
a second elastic washer located between the intermediate fixing ring and the second seating,
where the first elastic washer and the second elastic washer are compressed establishing on the fixing ring integral with the shaft in a balanced position located between end positions of the clearance.

5. The heat recuperator according to claim 3 wherein the shaft has a lever on which an arm of an actuator acts for the operation of the flap.

6. The heat recuperator according to claim 1 wherein an end of the flap has a support rib within the inside of the exhaust conduit to prevent becoming locked in place.

7. The heat recuperator according to claim 1 wherein the section of the exhaust conduit is circular.

8. The heat recuperator according to claim 7, wherein an opposite end of the flap pivots about the geometric axis of rotation Y-Y' has an elliptical contour shape.

9. The heat recuperator according to claim 8, wherein the flap has sides having a straight sector which are smaller than the width of the exhaust conduit to prevent becoming locked in place.

10. The heat recuperator according to claim 6, wherein the length of the flap between the end of the flap and the geometric axis of rotation Y-Y' is configured such that when in the first end position resting within the inside of the exhaust conduit is position oblique to the longitudinal direction X-X'.

11. The heat recuperator according to claim 1, further comprising a compressible conduit sector, configured in a form of a bellow, is arranged between the first opening and the second opening to compensate for expansion differences.

12. The heat recuperator according to claim 1, further comprising a sector within an edge of the first opening is configured to support at least part of the flap when the flap is in the first end position.

* * * * *